United States Patent [19]

Schmiel

[11] 4,445,541

[45] May 1, 1984

[54] HYDRAULIC REMOTE CONTROL JOYSTICK

[75] Inventor: Herbert H. Schmiel, Fridley, Minn.

[73] Assignee: Dana Corporation, Toledo, Ohio

[21] Appl. No.: 280,473

[22] Filed: Jul. 6, 1981

[51] Int. Cl.³ ........................ F16K 31/02; F16K 31/44

[52] U.S. Cl. ............................ 137/636.2; 137/596.12; 250/221

[58] Field of Search ....................... 137/596.12, 596.14, 137/596.16, 636.2; 91/170 MP; 250/221, 227

[56] References Cited

U.S. PATENT DOCUMENTS

| | | | |
|---|---|---|---|
| 3,612,882 | 10/1971 | Sheppard | 250/208 |
| 3,679,906 | 7/1972 | Myers | 250/239 |
| 3,814,199 | 6/1974 | Jones | 180/6.5 |
| 3,881,106 | 4/1975 | Pocker et al. | 250/221 X |
| 4,045,667 | 8/1977 | Hanson | 250/226 |
| 4,118,100 | 10/1978 | Goell et al. | 250/227 X |

FOREIGN PATENT DOCUMENTS

| | | | |
|---|---|---|---|
| 2639486 | 9/1978 | Fed. Rep. of Germany | 137/636.2 |

*Primary Examiner*—Martin P. Schwadron
*Assistant Examiner*—Stephen M. Hepperle
*Attorney, Agent, or Firm*—Merchant, Gould, Smith, Edell, Welter & Schmidt

[57] ABSTRACT

A joystick controller 10 for remotely controlling hydraulic directional control valve 82 and also for controlling a solenoid actuated pressure build-up valve 90 is disclosed. A light-emitting diode 19 is carried in and by a handle 13 of the joystick controller 10. A photosensitive transistor 31 receives the light emitted from the light-emitting diode 19. When the handle 13 moves off of a neutral position, a receptacle 28 blocks the light from the photo-transistor 31. In one embodiment, a fiber optic light conductor 20 extends from the light-emitting diode 19 toward the photo-transistor 31. The photo-transistor 31 then actuates a relay switch which sends a control signal to a solenoid actuated pressure build-up valve 90, thereby providing a ready means for effectuating both the control of the hydraulic directional control valve 82 and the pressure build-up valve solenoid 90 with one controller 10.

13 Claims, 3 Drawing Figures

HYDRAULIC REMOTE CONTROL JOYSTICK

BACKGROUND OF THE INVENTION

1. Field of the Invention

This invention relates generally to controls for hydraulic directional control valves and more particularly to a hydraulic remote control joystick with an electronic switch to remotely control a solenoid operated pressure build-up valve and provide pressurized flow to actuate a hydraulically operated open-center directional control valve.

2. Description of the Prior Art

Hydraulic directional control valves employing a minimal pressure open center circuit and also being remotely controlled by modulating hydraulic controls require a separate actuator circuit to actuate the spools in the directional control valve. The separate circuit may be powered by either a separate power source, such as a separate pump, or by utilizing the main pump flow. The pressure in the main pump flow is typically in the range of up to 5,000 pounds per square inch when the directional control valve spool is actuated. The separate circuit only requires approximately 100 to 500 pounds per square inch pressure to operate. Therefore, when the main pump flow is utilized, it is advantageous to utilize only a portion of the main pump pressure and flow. This reduction in pressure and flow is accomplished by means of a pressure build-up valve for minimum actuating pressure, a pressure reduction valve to limit the maximum pressure, and a flow control valve to limit the flow of 1–5 gallons per minute when the pressure build-up valve is energized by means of a solenoid.

On a hydraulic remote controlled directional control valve with an open center circuit and using a joystick type of master control, this feature has not been readily adapted for use. It has been necessary to manually actuate the solenoid by means of a separate switch. In an open center circuit, when the spool is in the neutral position, the main pump flow will go through the control valve and back to the tank at a very low pressure. When the spool is shifted to either the right or left, the open center is closed off and the flow is directed to the work ports up to maximum pump pressure. While the design parameters of each open center circuit are different, typically a 3–4 degree movement in the joystick control moves the spool sufficiently to start closing off the open center. Therefore, the signal to the pressure build-up valve in the actuator circuit must be given before the 3 to 4 degree movement of the joystick control. If the signal was delayed beyond the 3–4 degree movement, a hydraulic pressure would be generated beyond the expected starting pressure to the actuator, causing the directional control valve spool to overrun its metering position, and in turn, create a jump pressure condition causing the hydraulic motor to start erratically instead of a smooth operation of the hydraulic motor. Therefore, it has been necessary for the operator to manually energize the solenoid to the pressure build-up valve by separate switch before moving the joystick control.

This invention allows the joystick controller to automatically send a signal via a beam of light located inside the joystick to actuate an electronic relay switch which energizes the solenoid of the pressure build-up valve without the operator actuation of a separate switch.

The control of circuitry by selective illumination and prevention of illumination of a light sensitive element by a light emission device are known. An example of this is a motor control apparatus adapted for use with a motorized vehicle such as a wheel chair. The vehicle includes two drive wheels, each being driven by its own separate motor, a mask, transmittor, and receiver assembly. This assembly can include four light emitting diodes and corresponding, oppositely disposed light receivers. Two of the emitter/receiver pairs are tied to each of the drive wheel motors. One of the pairs effectuates switching to drive the motor in one direction and the other of the pairs is linked to circuitry which causes the motor to be driven in the opposite direction. A mask is innerposed between the emitters and receivers so that light from certain emitters can be selectively unmasked and permitted to illuminate corresponding receivers in order to operate the drive motor as desired.

Another example is a control apparatus which is specifically designed for use in controlling propulsion and brake functions in rapid transit vehicles. The structure includes a fan-shaped mask having arcuate slots formed therein. The fan-shaped mask can be pivoted in a plane generally perpendicular to the direction of light emitted by a number of sources so that, as the mask is pivoted, light will be permitted to pass through various of the slots and illuminate various photo-responsive sensors. Illumination of these sensors actuates control circuits to operate the various propulsion and braking functions.

Still another example of a light operated control device is a structure that inclues a sphere housing and a photocell recessed therein. The sphere is part of a ball joint structure which can be rotated so that a light sensitive side of the photocell can be illuminated by various light emission devices positioned about the sphere. The photocell is connected to control circuitry which is used to effectuate various functions.

In another control device, the functions are not controlled by allowing illumination of a light sensitive photocell and selective interruption of the illumination. Rather, the illumination is constant, with the function being controlled by the color of the light which is received by the photo detector array. The color of light which is received is controlled by selective rotation of a knob at the end of a control stick. Rotation of the knob causes the color of the light to be varied by interposing a mirror coated with a different colored filter material in the path of the light beam.

To date, there are no known control structures for remotely controlling hydraulic directional control valves that also accomplish the function of remotely controlling a solenoid in a separate actuator circuit by means of an electronic relay switch controlled by a beam of radiant energy incorporated within the joystick controller.

The present invention addresses the problems associated with the prior art devices which require an operator to operate a separate switch from the joystick controller to operate the solenoid on a separate actuator circuit. The present invention provides a ready means for effectuating both the control of a hydraulic directional control valve and energizing a solenoid with one control handle.

SUMMARY OF THE INVENTION

The present invention is a joystick controller for remotely controlling hydraulic directional control valves and also for controlling a solenoid. In one embodiment, the solenoid actuates a pressure build-up valve in an actuator circuit.

The joystick controller has a handle which has an axis with respect to which it is pivoted about a point. A means for transmitting a movement in the handle to a plurality of auxiliary spools is provided. The auxiliary spools actuate a plurality of remote directional control spools in a hydraulic directional control valve. In one embodiment, a cam plate is attached to the handle perpendicular to a longitudinal axis of the handle. Any pivotal movement of the handle causes the cam plate to coact with at least one of four plunger assemblies. A depression of the plunger assembly causes a spring to be compressed, thereby moving an auxillary spool in an auxiliary control valve. The movement in the auxillary spools permits hydraulic fluid in the actuator circuit to be directed toward the remote directional control valve spools until the resultant hydraulic force on the directional control valve spool spring is in equilibrium with the hydraulic force on the controller plunger spring, thereby controlling the movement of the remote directional control valve spools.

A radiant, energy means is carried in and by the handle and emits radiant energy generally parallel to a longitudinal the axis of the handle. In one embodiment, the radiant energy means is a light-emitting diode.

A means for receiving the radiant energy is provided. In one embodiment, the receiving means comprises a photosensitive transister.

The receiving means provides a control signal dependent upon a relative movement of the handle. A receptacle is positioned between the radiant energy means and the receiving means. The receptacle has a hole to allow the radiant energy to be received by the receiving means when the handle is in a neutral position. When the handle moves off of the neutral position, the receptacle blocks the radiant energy from the receiving means. When the radiant energy is blocked, the receiving means actuates a relay switch which sends a control signal to a remote solenoid.

To aid in transmitting the radiant energy to the receiving means, a fiber optic light conductor extends from the radiant energy means toward the receiving means and terminates at a position spaced from the receiving means.

The hole in the receptacle is sized such that the movement of the handle that is required to cause the receptacle to block the radiation from being received by the receiving means energizing a relay to an on position and thereby actuating the pressure build-up solenoid. The movement is less than the rotation required to start closing off the open center in the directional control valve and direct a main flow to the work ports in the directional control valve.

The present invention thereby provides a ready means for effectuating both the control of the hydraulic directional control valve, and the pressure build-up valve solenoid with one controller. Also, the solenoid is actuated before the open center in the control valve starts to close and the flow from the main pump is diverted to the work ports.

DETAILED DESCRIPTION OF THE INVENTION

Figure 1:
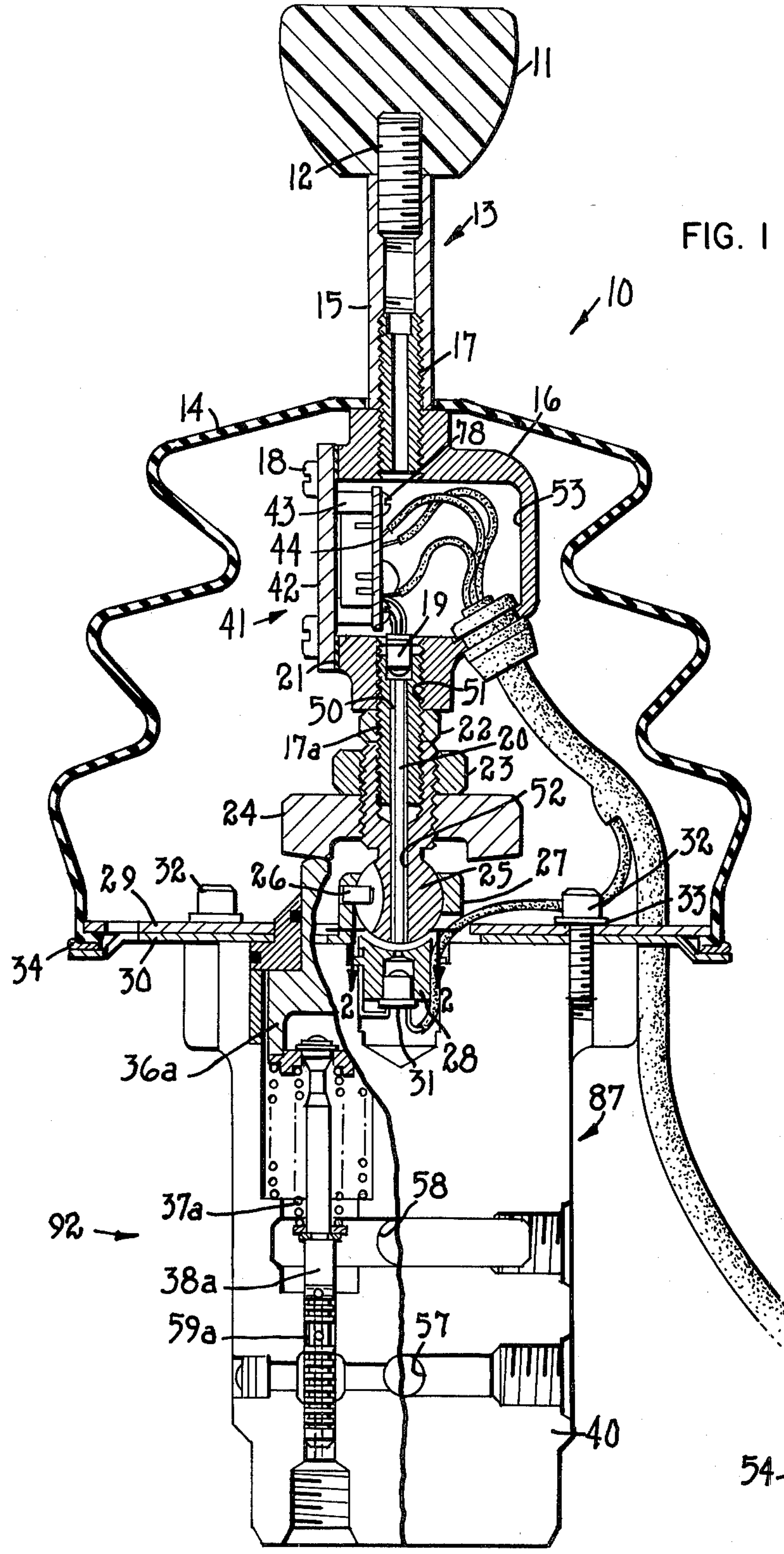
FIG. 1 is a side-elevation in cross-section of the present invention with portions broken away.

Referring to the drawing, wherein like numerals represent like parts throughout the several views, there is generally illustrated at 10 in FIG. 1, a joystick controller to control remote hydraulic control valves and a remote solenoid. A handle assembly, generally designated as 13, comprises a knob 11 connected to a stem 15 by means of a stud 12. The stem 15 is connected to a junction box 16 by a stud 17. A second stud 17*a* is threaded into the opening 51 of the junction box 16. The stud 17*a* has a longitudinal bore 50. A nut 22 is used to fasten the stud 17*a* to the junction box 16. A pivot ball 25 having a longitudinal bore 52 is cooperatively connected to the stud 17*a*. Cam plate 24, lying generally perpendicular to a longitudinal axis of the handle assembly 13, is threaded to the pivot ball 25 and fastened in place by nut 23. A pivot ball 25 is retained by pivot ball socket 27 and guided by pin 26 to maintain alignment of handle 13. Mounting plate 29 retains pivot ball socket 27. While the construction of handle assembly 13 has been described in detail, it is understood that there are numerous combinations that would result in a similar structure.

Figure 2:
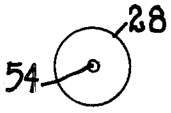
FIG. 2 is a transverse section taken generally along the lines 2—2, of FIG. 1.

A radiant energy means 19 is carried by the handle assembly 13. In one embodiment, the radiant energy means 19 is a light emitting diode and is located in the internal cavity 53 of junction box 16. The radiant energy means 19 emits radiant energy generally parallel to the longitudinal axis of the handle assembly 13 and through bores 50 and 52. A receiving means 31 is positioned in recepticle 28. As shown in FIG. 2, the recepticle 28 has a hole 54 in alignment with the bore 52. In one embodiment, a fiber optic light conductor 20 extends from the radiant energy means 19 toward the receiving means 31 and terminates at a position spaced from the receiving means 31. In the preferred embodiment, the receiving means 31 is a photosensitive transister.

Figure 3:
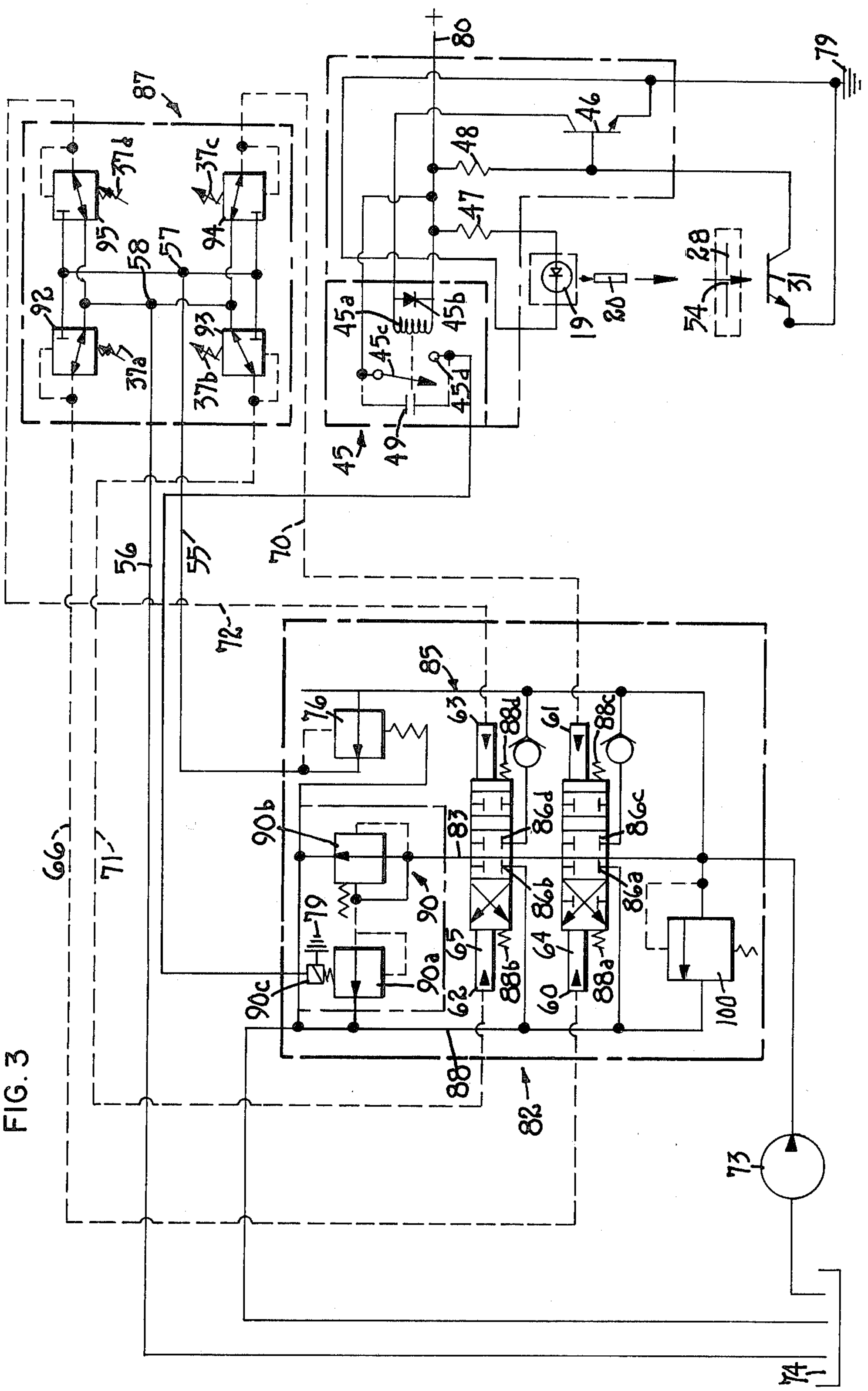
FIG. 3 is a schematic representation of a hydraulic remote control incorporating the present invention.

Mounting plate 30 is cooperatively connected to the mounting plate 29 and housing 40 by screws 32 and washers 33. Housing 40 encloses what is generally designated as 87, an auxiliary control valve. The auxiliary control valve 87 has a first, second, third and fourth assemblies 92, 93, 94 and 95, as shown in the schematic of FIG. 3. FIG. 1 shows the first assembly 92 in detail, with the second, third and fourth assemblies similar to the first assembly 92. The first assembly 92 comprises first auxiliary spool 38*a*, first bore 59*a*, first spring 37*a* and first plunger assembly 36*a*. The second assembly 93 comprises a second auxiliary spool, second bore, second spring 37*b* and second plunger assembly. The third assembly comprises a third auxiliary spool, third bore, third spring 37*c* and third plunger assembly. The fourth assembly comprises a fourth auxiliary spool, fourth bore, fourth spring 37*d* and fourth plunger assembly. First auxiliary spool 38*a* is positioned for slidable movement within first bore 59*a*. First spring 37*a* is connected to the auxiliary spool 38*a*. First plunger assembly 36*a* is positioned on top of first spring 37*a* and underneath cam plate 24.

A housing 40 has a supply passage 55, as shown in the schematic view of FIG. 3, for connection to a supply of hydraulic fluid under pressure and a discharge passage 56 for connection to a reservoir 74. A first bore 59*a* is connected to the supply passage 55 and discharge passage 56. Second, third and fourth auxiliary spools are positioned within second, third and fourth axial bores, similar to first auxiliary spool 38*a* and first axial bore 59*a*, and are also connected to supply passage 55 and discharge passage 56. The first bore 59*a* is connected to a first end 60 of a first remote directional control spool 64 by passage 66. The second bore is connected to the second end 61 of the first remote directional spool 64 by passage 70. The third bore is connected to the first end 62 of the second remote directional control spool 65 by passage 71. The fourth bore is connected to the second end 63 of the second directional control spool 65 by passage 72.

Cover 42 of switch assembly generally designated at 41 is mounted to the junction box 16 by screws 18. The printed circuit board 44, on which the components of the switch assembly 41 are mounted, is attached to the cover 42 by stand offs 43 and screws 78.

A boot 14 is held in position around the lower portion of the handle assembly 13 by a retainer 34.

Switch assembly designated generally at 41, in general sends a control signal to actuate a remote solenoid 90*c*.

Referring to FIG. 3, a radiant energy source 19 which is in the preferred embodiment a light emitting diode has its anode connected through a resistor 47 to the positive end of bus 80 and its cathode directly connected to the reference terminal 79. The light emitted from diode 19, when energized, is transmitted through a fiber optic conductor generally designated at 20. The light transmitted through the fiber optic conductor 20 impinges upon a photosensitive NPN transister 31. The photosensitive transister 31 has a base disposed to receive the light source energy from the diode 19, an emitter connected to the reference terminal 79 and a collector connected through a resistor 48 to the positive buss 80.

The collector of transistor 31 is also connected to the base of a NPN switching transistor 46. Transistor 46 further has an emitter connected to the reference terminal and a collector connected through the energizing coil 45*a* of a relay 45 to the positive buss 80. The relay 45 further has a shunting diode 45*b* connected across the energizing coil 45*a* and a movable contact is connected to the positive buss 80 and is operable to apply the buss potential to a stationary contact 45*d*. Movable contact 45*c* is normally operable in an open condition when the energizing coil 45*a* is not energized. A capacitor 49 is connected in parallel with the movable contact 45*c* cross the positive buss 80 and the stationary contact 45*d*.

The stationary contact 45*d* of the relay 45 is connected through solenoid 90*c* of the pressure build-up valve 90, to the reference 79.

In the directional control valve, designated generally as 82, a pump 73 supplies hydraulic fluid under pressure from reservoir 74. Typically, the pump will provide a flow of 10 to 100 gallons per minute having a pressure of from 50 to 5000 pounds per square inch. As shown in the schematic in FIG. 3, a pressure build-up valve 90, having a pilot element 90*a*, reaction element 90*b* and solenoid 90*c*, is connected to the passageway 83 for the main pump flow. Pressure reduction valve 76 is connected to the pump pressure by passageway 85. The pressure build-up valve 90, pressure reduction valve 76, and passages 85 and 55 are components of an actuator circuit. The actuator circuit provides hydraulic fluid under 100–500 pounds per square inch pressure to the auxiliary control valve 87.

In operation, when the handle assembly 13 is in a neutral position, the radiant energy from the light emitting diode 19 is transmitted through a fiber optics light controller 20 positioned in bores 50 and 52 and passes through a hole 54 in receptacle 28. The light emitting diode is normally biased in a conducting mode to emit radiant light energy through the fiber optic conductor 20. The light is received by the photosensitive transister 31. The control signal from the photosensitive transister provides for the electronic switch 41 to be in the off position until the beam from the light emitting diode 19 to the photosensitive transister 31 is blocked.

Before the movement of the handle 13 which is pivoted about a point, causes the spools 64 and 65 to start closing off the open center in the directional control valve 82, the movement of the handle 13 causes the receptacle 28 to block the light from the light emitting diode 19 from being received by the photosensitive transister 31. The photosensitive transistor 31 is normally biased in a conducting mode when light transmitted through the fiber optic conductor 20 impinges upon it. When transistor 31 is conducting, current flows from the positive buss 80 through resistor 48, through transistor 31 to the reference 79. When transistor 31 is conducting, the voltage drop across it is insufficient to forward bias the base-emitter junction of the switching transistor 46, causing transistor 46 to be operative in a non-conducting mode of operation. When transistor 46 in non-conducting, relay 45 will be deenergized causing the pressure build-up valve 90 to be deactuated.

When light is blocked from transistor 31, by the movement of handle 13 relative to the receptacle 28, transistor 31 becomes operative in a non-conducting mode, momentarily causing the voltage level at base of transistor 46 to rise to a sufficient level to forward bias the base-emitter junction of transistor 46, driving transistor 46 into a conductive mode of operation. When transistor 46 is switched to its conducting mode, a current flow path is established from the positive buss 80, through the energizing coil 45*a* of the relay 45 through the transistor 46 and to the reference 79. The surge of current flow through the energizing coil 45*a* of the relay 45 causes the movable contact 45*c* of the relay 45 to move into engagement with the stationary contact 45*d*, thereby establishing a current flow path from the positive buss 80 through the movable contact 45*c* and through the solenoid 90*c* of the pressure build-up valve 90 to the reference 79. Energization of the solenoid 90*c* causes the pilot element 90*a* of the pressure build-up valve 90 to actuate the reaction element 90*c*. When the reaction element 90*c* is actuated, the passageway 83 is restricted by the reaction element 90*c*, causing the pressure to build-up in passageway 83. This results in an increased pressure in passage 85 to the pressure reduction valve 76. The flow out of the pressure reduction valve 76 to the supply passage 55 of the hydraulic control actuator circuit is typically in the range of the pressure build-up generated. Hydraulic fluid enters the auxiliary hydraulic control valve 87 through the supply port 57.

The amount of movement of the handle 13 for the receptacle 28 to block the light, causing the photosensitive transistor 31 to de-energize the switch assembly 41 to the on position is controlled by the size of the hole 54, as shown in FIG. 2, in the receptacle 28. The smaller the hole 54, the less movement is required to de-energize the switch 41. As will be evident later, the pivotal movement of the handle 13 that is required for the receptacle 28 to block the beam of light from the photosensitive transister 31 is less than the movement required to have the first auxiliary spool 38*a*, and the second, third and fourth auxiliary spools move the directional control spools 64 and 65 to start closing off the open center in the directional control valve 82 and direct the main pump flow to the work ports 86*a*, 86*b*, 86*c*, and 86*d*.

Further movement of the handle 13 causes the cam plate 24 to coact with one or more of the first, second, third or fourth plunger assemblies. To move the first remote directional control spool 64 to the right, as viewed in FIG. 3, the cam plate 24 depresses the first plunger assembly 36*a* which compresses the spring 37*a*, thereby moving the auxiliary spool 38*a*. When the first auxiliary spool 38*a* is moved, hydraulic fluid moves from the supply passage 55 through the bore 59*a* and out passageway 66. The hydraulic fluid in passage 66 causes the first end 60 of the first remote directional control spool 64 to move to the right, thereby compressing spring 88*a*. When the hydraulic force on the spring 88*a* is in equilibrium with the hydraulic force on the spring 37*a*, the first end 60 is stationary. The hydraulic fluid from 61 flows through passage 70 to the third bore and out through discharge port 58 to the discharge passageway 56 leading to the reservoir 74.

To move the first remote directional control spool 64 to the left, as viewed in FIG. 3, the cam plate 24 depresses the third plunger assembly which compresses third spring 37*c*, thereby moving the third auxiliary spool. When the third auxiliary spool is moved, hydraulic fluid moves from the supply passage 55 through the third bore and out passageway 70. The hydraulic fluid in passage 70 causes the second end 61 to move to the left, thereby compressing spring 88*c*. When the hydraulic force on the compression of spring 88*c* is in equilibrium with the hydraulic force on the spring 37*c*, the second end 61 is stationary. The hydraulic fluid from 60 flows through passage 66 to the first bore 59*a* and out through discharge port 58 to the discharge passageway 56 leading to the reservoir 74.

To move the second remote directional control spool 65 to the right, as viewed in FIG. 3, the cam plate 24 depresses the second plunger assembly which compresses second spring 37*b*, thereby moving the second auxiliary spool. When the second auxiliary spool is moved, hydraulic fluid moves from the supply passage 55 through the second bore and out passageway 71. The hydraulic fluid in passage 71 causes the first end 62 to move to the right, thereby compressing spring 88*b*. When the hydraulic force on the spring 88*b* is in equilibrium with the hydraulic force on the spring 37*b*, the first end 62 is stationary. The hydraulic fluid from 63 flows through passage 72 to the fourth bore and out through discharge port 58 to the discharge passageway 56 leading to the reservoir 74.

To move the second remote directional control spool 65 to the left, as viewed in FIG. 3, the cam plate 24 depresses the fourth plunger assembly which compresses the spring 37*d*, thereby moving the fourth auxiliary spool. When the fourth auxiliary spool is moved, hydraulic fluid moves from the supply passage 55 through the fourth bore and out passageway 72. The hydraulic fluid in passage 72 causes the second end 63 to move to the left, thereby compressing spring 88*d*. When the hydraulic force on the spring 88*d* is in equilibrium with the hydraulic force on the spring 37*d*, the second end 62 is stationary. The hydraulic fluid from 62 flows through passage 71 to the second bore and out through discharge port 58 to the discharge passageway 56 leading to the reservoir 74.

In one embodiment, the first and second remote directional control spools 64 and 65 start to close off the opening center in the directional control valve 82 after the handle 13 has pivoted three degrees. The hole 54 in the receptacle 28 is sized so that the light from the light emitting diode 19 is blocked from the photosensitive transister 31 after a two degree rotation.

While the present invention has been described as controlling a remote solenoid to actuate a pressure build-up valve, it is understood, that it may also be used in other applications than in a utility section of a directional control valve. One such example would be the application of actuating a solenoid that would operate a two-way or selector valve.

The present invention could easily be modified to control a variety of circuits requiring a control signal in addition to a solenoid. The control signal from the relay switch 45 could control a horn, buzzer or other warning circuits.

Modifications of the invention will be apparent to those skilled in the art in light of the foregoing description. This description is intended to provide specific examples of individual embodiments which clearly disclose the present invention. Accordingly, the invention is not limited to these embodiments or to the use of elements having specific configurations and shapes as presented herein. All alternative modifications and variations of the present invention which follows in the spirit and broad scope of the appended claims are included.

What is claimed is:

1. A joystick controller having a handle which has an axis with respect to which it is pivoted about a point and a means for transmitting a movement in the handle to a plurality of auxilary spools, the auxiliary spools actuating a plurality of remote direction control spools to remotely control hydraulic directional control valves and the movement controlling a device for actuating a pressure build-up in an actuator circuit comprising:

(a) radiant energy means carried by the handle and emitting radiant energy generally parallel to a longitudinal axis of the handle;

(b) means for receiving said radiant energy and providing a control signal dependent upon a relative movement of the handle, thereby controlling the device that is operable by said control signal; and (c) a receptacle positioned between said radiant energy means and said receiving means, said receptacle having a hole to allow the radiant energy to be received by said receiving means when said handle is in a neutral position and said receptacle to block said radiant energy when the handle moves off the neutral position.

2. The controller of claim 1, wherein said radiant energy means is a light emitting diode.

3. The controller of claim 2, further comprising a fiber optic light conductor extending from said radiant energy means toward said receiving means and terminating at a position spaced from said receiving means.

4. The controller of claim 3, wherein said receiving means is a photosensitive transistor.

5. The controller of claim 1, wherein said hole is of such a diameter, whereby said receptacle blocks said radiation energy from being received by said receiving means after a rotation of the handle that is less than the rotation required to start closing off the open center in the directional control valves and directs a main pump flow to work ports in the directional control valves.

6. The controller of claim 5, wherein after a 2 degree rotation of the handle, said receptacle will block said radiation energy from being received by said receiving means.

7. A joystick controller having a handle which has an axis with respect to which it is pivoted about a point and a means for transmitting a movement in the handle to a plurality of auxilary spools, the auxilary spools actuating a plurality of remote direction control spools to remotely control hydraulic directional control valves and the movement controlling a solenoid for actuating a pressure build-up valve in an actuator circuit comprising:

(a) a light emitting diode carried by the handle, said diode emitting light generally parallel to a longitudinal axis of the handle;
(b) a photosensitive transistor for receiving said light from said light emitting diode;
(c) said photosensitive transistor providing a control signal dependent upon a relative movement of the handle, thereby controlling the remote solenoid which activates a pressure build-up valve;
(d) a fiber optic light conductor extending from said light emitting diode toward said photosensitive transistor and terminating at a position spaced from said photosensitive transistor, thereby providing a passage for the light from said light emitting diode to said photosensitive transistor; and
(e) a receptacle positioned between said light emitting diode and said photosensitive transistor, said receptacle having a hole to allow said light from said light emitting diode to be received by said photosensitive transistor when said handle is in a neutral position and said receptacle to block said light when the handle is moved off the neutral position.

8. A joystick controller in a hydraulic control to remotely control hydraulic directional control valves and a solenoid for actuating a pressure build-up valve in an actuator circuit comprising:

(a) a housing having a supply passage for connection to a supply, a discharge passage for connection to a reservoir, a first, second, third and fourth axial bore connected to said supply and discharge passage;
(b) said first bore connected to a first end of a first remote directional control spool, said second bore connected to a second end of a first remote directional control spool, said third bore connected to a first end of a second remote directional control spool and said fourth bore connected to a second end of a second remote directional control spool;
(c) a mounting plate cooperatively connected to said housing;
(d) a handle having a pivot ball at one end;
(e) a ball pivot socket cooperatively connected to said mounting plate;
(f) said pivot ball cooperatively connected to said ball pivot socket;
(g) means for actuating an auxiliary spool in each of said bores, whereby the first and second directional control spools are displaced;
(h) radiant energy means carried by the handle and emitting radiant energy generally parallel to a longitudinal axis of said handle;
(i) means for receiving said radiant energy and said receiving means providing a control signal dependent upon a relative movement of said handle, thereby controlling remote solenoid that is operable by said control signal, wherein when said handle is in a position which starts to close off an open center in the directional control valve and directs a main pump flow to work ports in the directional control valve, said receiving means is not to be irradiated by said radiant energy from said radiant energy means.

9. Apparatus for actuating a pressure build-up valve in a hydraulic device which includes a plurality of spools controlled by a joystick controller which has an axis with respect to which it is pivoted about a point between a neutral position and various offset positions in which the spools are moved to effect operation of the device, comprising:

(a) radiant energy emitting means carried by the controller and transmitting energy unidirectionally;
(b) a radiant energy receiver disposed such that said radiant energy irradiates said receiver when the controller is one of in and closely proximate its neutral position;
(c) means responsive to movement of the controller for providing a control signal, said control signal operatively connected to a pressure build-up valve for energizing a pressure build-up valve when said receiver is not irradiated and for de-energizing a valve when said receiver is irradiated; and
(d) a receptacle positioned between said radiant energy means and said receiving means, said receptacle having a hole to allow the radiant energy to be received by said receiving means when said handle is in a neutral position and said receptacle to block said radiant energy when the handle moves off the neutral position.

10. In a hydraulic control system of the type having a joystick controller having a handle which has an axis with respect to which it is pivoted about a point and a means for transmitting a movement in the handle to a plurality of auxiliary spools, the auxiliary spools actuating a plurality of remote directional control spools to remotely control hydraulic directional control valves and an actuator device circuit, wherein the improvement comprises:

(a) radiant energy means carried by the handle and emitting radiant energy generally parallel to a longitudinal axis of the handle;
(b) means for receiving said radiant energy and providing a control signal dependent upon a relative movement of the handle, thereby controlling the device circuit that is operable by said control signal; and
(c) a receptacle positioned between said radiant energy means and said receiving means, said receptacle having a hole to allow the radiant energy to be received by said receiving means when said handle is in a neutral position and said receptacle to block said radiant energy when the handle moves off the neutral position.

11. The control system of claim 10, wherein said radiant energy means is a light emitting diode.

12. The control system of claim 11, further comprising a fiber optic light conductor extending from said radiant energy means toward said receiving means and terminating at a position spaced from said receiving means.

13. The control system of claim 12, wherein said receiving means is a photosensitive transistor.

* * * * *